United States Patent [19]

Boozer

[11] 4,309,962

[45] Jan. 12, 1982

[54] LIVESTOCK WATERING STATION

[76] Inventor: John D. Boozer, 336 NE. 44th Ave., Ocala, Fla. 32670

[21] Appl. No.: 194,434

[22] Filed: Oct. 6, 1980

[51] Int. Cl.³ .............................................. A01K 7/02
[52] U.S. Cl. ................................................... 119/74
[58] Field of Search ................... 119/74, 73; 137/403

[56] References Cited

U.S. PATENT DOCUMENTS

| | | | |
|---|---|---|---|
| 920,781 | 5/1909 | Simmons | 119/74 |
| 983,472 | 2/1911 | Bancroft et al. | 119/74 |
| 1,080,107 | 12/1913 | Greenberg | 119/74 |
| 2,446,695 | 8/1948 | Didget | 119/74 |
| 3,058,485 | 10/1962 | McQueen | 137/403 |
| 3,306,263 | 2/1967 | Johnson | 119/73 |

*Primary Examiner*—Hugh R. Chamblee
*Attorney, Agent, or Firm*—Watson, Cole, Grindle & Watson

[57] ABSTRACT

A housing for a livestock drinking station is formed by a hemispherically-shaped drinking basin including a water outlet located substantially in the bottom center of the basin and a swirl-type water inlet integrally formed in one side thereof. A continuous side wall extends around the periphery of the basin and is tapered outwardly from the top of the basin toward the bottom thereof and includes a continuous shoulder for supporting the basin within the ground. The basin and continuous side wall are integrally made of shock-proof, reinforced fiberglass material affording a smooth, non-porous external surface. The continuous side wall and the basin form a smooth rounded top edge surface. A fast-flow drain is removably mounted within the water outlet and includes an adjustable orifice for varying the flow of water from the fast-flow drain. An automatic water feed valve in the water inlet line maintains a constant water level in the basin. A drainage system is located under the fast-flow drain within the interior of the housing for draining water flowing from the basin.

5 Claims, 3 Drawing Figures

LIVESTOCK WATERING STATION

BACKGROUND OF THE INVENTION

1. Field of the Invention

This invention is directed to livestock watering stations for supplying drinking water to domestic or zoo animals, and in particular to such devices which automatically control the flow of fresh drinking water and which afford a self-cleaning action as water enters the bowl of the drinking station.

2. Prior Art

Known livestock watering stations have certain disadvantages resulting from requirements relating to installation and maintenance and may be a source of injury and/or sickness to livestock. Thus, watering stations made of concrete, clay materials, or metal are either porous or corrosive, and thereby absorb the water and impurities contained therein and which may become embedded in the porous material below the surface of the water and remain impervious to ordinary cleaning methods. Such conditions are conducive to the breeding of unwanted bacteria and algae. Moreover, the chore of periodically cleaning such watering stations is laborious, time consuming, and inadequate. Such periodic cleaning is often accompanied by the creation of a messy, unsightly slough about the vessel, which, again, becomes a breeding ground for flies, mosquitoes, and other disease-carrying insects. The shape of prior art watering stations, combined with a rough exterior surface, may contribute to the injury of animals by the infliction of abrasions, bruises, and lacerations when the legs, knees, or other parts of the animal's body come into contact with the sides or other portions of the drinking vessel.

SUMMARY OF THE INVENTION

The livestock drinking station in accordance with the invention overcomes all of the aforementioned disadvantages of prior art livestock drinking vessels. In accordance with the invention, the livestock drinking station is embedded in the soil with sod built up over a projecting shelf or shoulder, which may be integral with the remaining portion of the drinking station, and a bed of loose gravel is laid in the interior drain area. A drain plug in the bottom central portion of the water bowl is equipped with a recessed handle, and when removed, enables the basin to be rapidly emptied of water for cleaning. Drain water does not accumulate in the sod or turf surrouding the drinking station as it is poured onto the loose gravel and dirt in the drain area under the drain plug.

The water feed line includes a feed valve which is automatically opened or closed as required by a set water pressure to maintain a substantially constant water level within the drinking vessel. Fresh water from the automatic feed valve is injected into the drinking basin in a direction tangent to the interior curved surface thereof so that it provides a swirling motion about the basin to create a washing action on the side wall thereof, thus inhibiting the formation of algae and unwanted organic matter.

The orifice in the drain plug may be left closed, or it may be adjusted to a selected size opening thereby permitting the escape of water at an adjustable flow rate to prevent stagnant water from accumulating within the drinking vessel. As the feed valve automatically maintains a constant water level, the drain action creates a circulation which ensures a constant supply of fresh, clean water in the drinking basin.

Thus, in accordance with the livestock drinking station of the invention, a cleaner, more efficient livestock watering installation is afforded. Such an installation requires significantly less cleaning and maintenance than known prior art drinking installations. When periodic cleaning is carried out, such a task is made much easier, is performed quicker, and is far more efficient than with known livestock drinking stations. Moreover, the circulating action provided through adjustment of the drain orifice in conjunction with the automatic operation of the water feed valve ensures a constant supply of fresh water, thereby reducing or eliminating the problems associated with stagnant water in livestock drinking stations. The smooth, non-porous surface of the drinking station inhibits the formation of organisms within the water, and on the surface or below the surface of the exterior or exposed portions of the drinking station. The contour of the drinking vessel with its smooth surfaces and slanted sides greatly lessens the chances of accidental injury to livestock using the drinking station. The shock-proof, reinforced fiberglass construction reduces damage to the watering station during shipment to, and emplacement at, the watering site, thereby affording a durable and reliable facility.

The one-piece, integral construction of the watering station affords portability by reducing the amount of time and labor required to move the watering station from one site to another.

DETAILED DESCRIPTION

Figure 1:
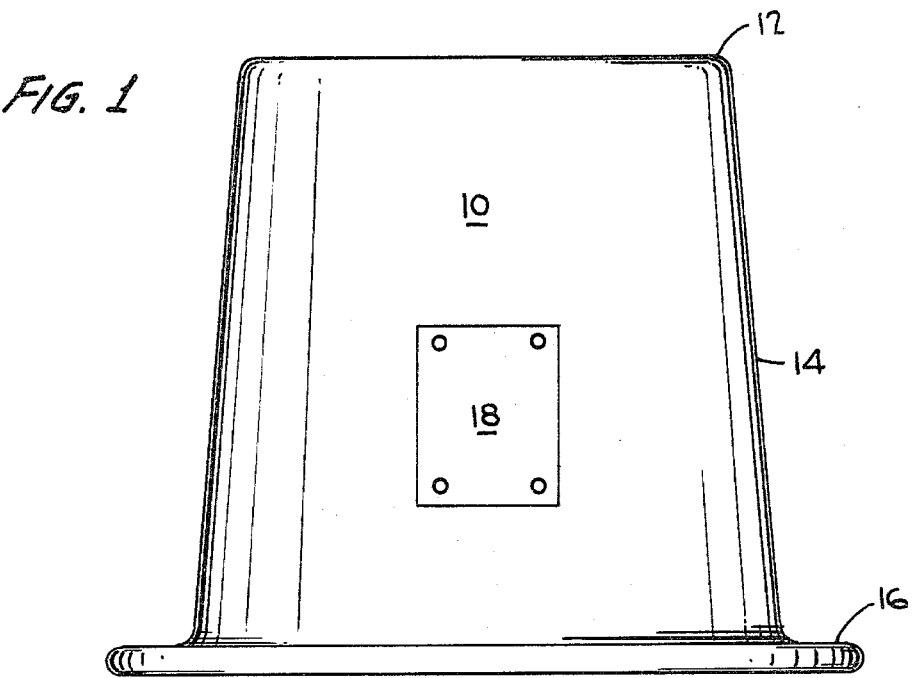
FIG. 1 is an exterior side view of the livestock drinking vessel in accordance with the invention.
Figure 2:
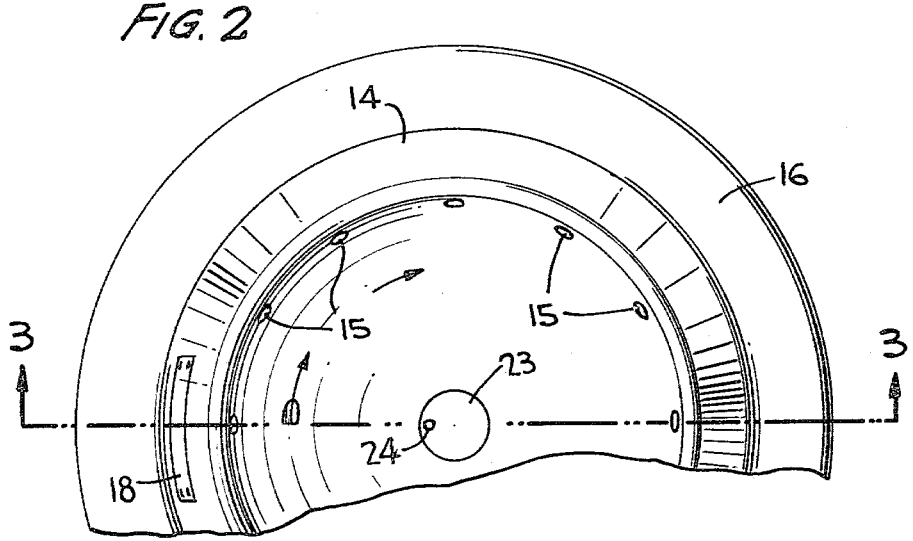
FIG. 2 is a horizontal partial cross-section of the livestock drinking vessel taken along line 2—2 of FIG. 3.

With reference to FIGS. 1 and 2, livestock watering station 10 is cylindrical in cross section having smooth rounded top edges, tapered sides 14 inclined outwardly from the top of livestock watering station 10 to the bottom thereof, and shoulder 16 which extends outwardly from the bottom of tapered side 14 and is preferably integral therewith. Shoulder 16 provides a means for anchoring the livestock watering station at a desired watering site, which will be more fully described hereinafter. Access door 18 is provided approximately one-third from the bottom of the livestock watering station and is secured to side 14 thereof by any appropriate means such as round-head or sunken screws. Livestock watering station 10 is made of shock-proof, reinforced fiberglass construction so as to provide smooth, non-porous surfaces and a rugged and durable construction. As shown in FIG. 2, equally spaced drain holes 15 are formed or drilled into the upper portion of basin 20 to provide for overflow of water.

Figure 3:
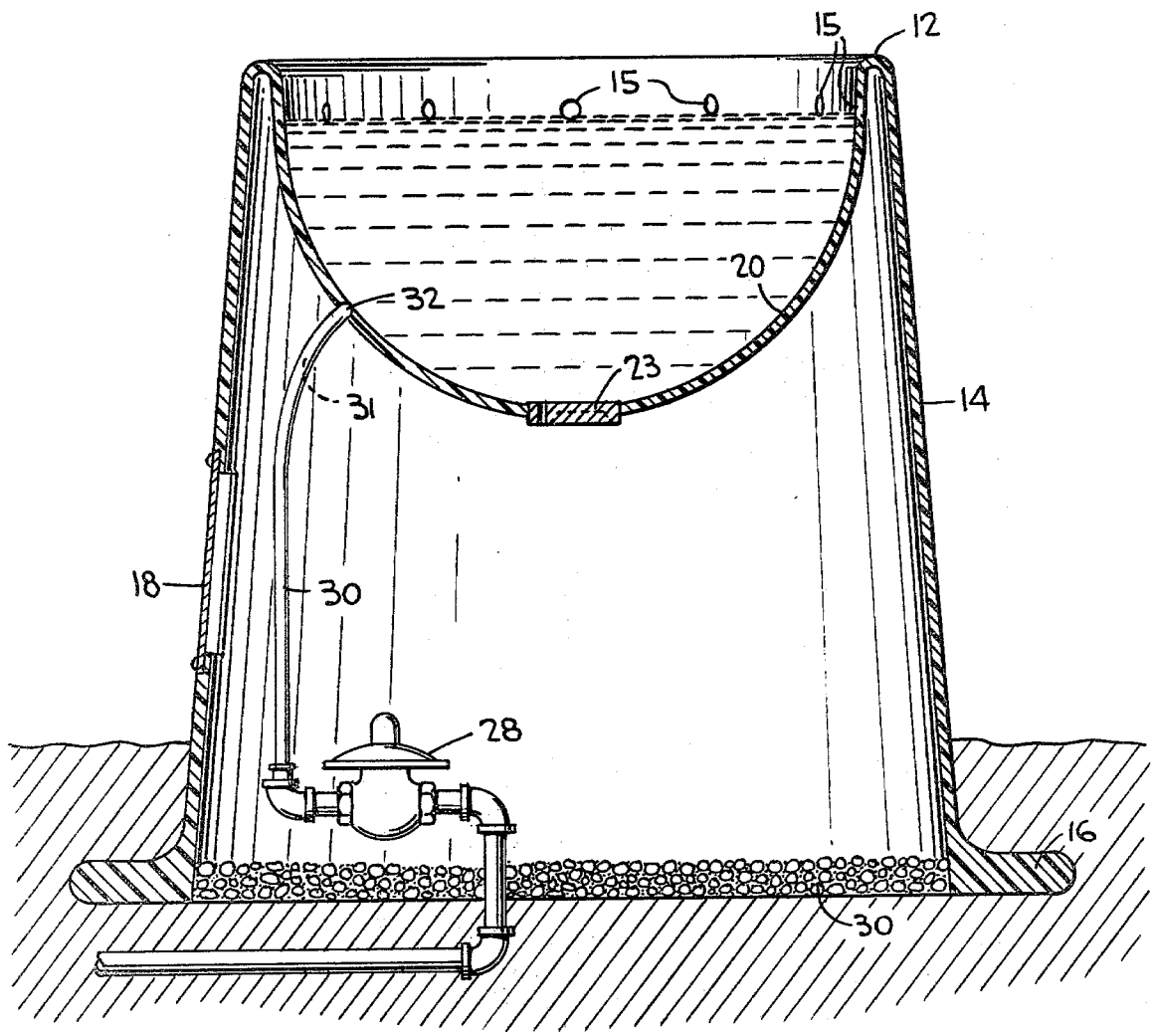
FIG. 3 is a vertical section of the livestock feeding station in accordance with the invention, which illustrates the essential features thereof.

As illustrated in FIG. 3, livestock watering station 10 includes a hemispherically-shaped bowl or basin 20 having a drain opening 22 in the central bottom portion thereof which is fitted with adjustable orifice mechanism 24 (to be described more fully hereinafter) for enabling water to drain from basin 20, as well as to provide a means for complete draining of the basin to clean the surfaces thereof. Water is provided through shut-off valve 26, automatic feed valve 28, inlet piping 30, and nipple 31 to water inlet port 32 such that water is injected into basin 20 approximately one-third from the bottom of the basin to provide a swirl-type flow pattern. Water inlet port 32 is molded in basin 20 and is integral therewith, thereby obviating a special fitting which is subject to corrosion and the collection of dirt and bacteria. As mentioned previously, the injection of water in such a manner will provide a swirling motion so as to provide a cleansing action to the sides of basin 20, as well as to maintain movement of the water to prevent it from becoming stagnant. Automatic feed valve 28 is of a known type which has an adjustable pressure setting such that the height of the water within basin 20 may be maintained at a desired constant water level. Automatic feed valve 28 is mounted adjacent the inside of access door 18 such that the automatic feed valve is readily accessible from the outside of livestock watering station 10. Automatic feed valve 28 may also be mounted on the exterior underside of basin 20 at inlet 32.

As illustrated in FIG. 3, livestock watering station 10 is embedded in the soil such that shoulders 16 are covered by the sod to a suitable depth to maintain the stability of the livestock watering station during its normal use. Such normal use would contemplate the bumping of a large domestic animal, such as a horse, against the livestock watering station. Thus, there must be a suitable depth of soil, for example four to six inches, over shoulder 16 in order to maintain the livestock watering station 10 at its desired location without its being susceptible to tilting. Of course, the amount of soil should not extend above the bottom of the opening of access door 18. Loose gravel 30 is provided for several inches depth at the bottom of the livestock watering station for quick, clean drainage of the water flowing from fast flow drain opening 22 during normal operation so as to prevent the soil in the immediate vicinity of the bottom of the livestock watering station from becoming soaked with water.

It is understood that livestock watering station 10 may also be operated such that no water is caused to drain from the adjustable orifice 24 in the bottom of basin 20, such that the only water that is provided to basin 20 through water inlet 32 is that necessary to replenish the water level due to the consumption of the livestock using the livestock watering station, or evaporation and spillage. When it is desired to clean basin 20, the adjustable orifice mechanism 24 is removed which results in an almost immediate draining of the water within basin 20. Recessed handle 23 may be extended to facilitate removal of adjustable orifice mechanism 24. After the basin is cleaned, the supply of water provided to basin 20 will rinse the surfaces thereof which then are drained outside of opening 22. The drain may then be replaced and adjusted to provide the necessary orifice so as to provide a desired amount of leakage of water from basin 20.

Typical dimensions of the watering station for use with cattle or horses are as follows:
Height top to bottom = 36"
Depth of basin = 18"
Extent of shoulders = 5"
OD of basin = 34"
ID of basin = 28"

The shock-proof, reinforced fiberglass body of the livestock watering station 10 enables it to be resistant to the formation of algae, as well as to absorb the bumping of large domestic animals such as cattle and horses, which may be utilizing the livestock watering station. The tapered sides 14 of livestock watering station 10 also eliminate or reduce damage that may be caused to the legs of horses which may have a tendency to rear in the vicinity of the livestock watering station. There are no projections in the external surfaces of the livestock watering station which would result in injury to the livestock using it.

What is claimed is:

1. A housing for a livestock drinking station, comprising:
    a hemispherically-shaped drinking basin including a water outlet located substantially in the bottom center of the basin and a swirl-type water inlet integrally formed in one side thereof;
    a continuous side wall extending around the periphery of said basin, said side wall being tapered outwardly from the top of said basin toward the bottom thereof and including a continuous shoulder for supporting the basin within the ground, said continuous side wall and said basin forming a smooth top edge surface and said basin and continuous side wall being integrally made of shock-proof, reinforced fiberglass material affording a smooth, non-porous external surface; and
    a fast-flow drain being removably mounted within said water outlet and including an adjustable orifice for varying the flow of water from said fast-flow drain.

2. The housing as in claim 1 further comprising a removable access door mounted in a portion of said continuous side wall.

3. A housing as in claim 1 further comprising a water inlet line and an adjustable automatic water feed valve for maintaining a constant water level in said basin and connected to said water inlet, said automatic water feed valve being located adjacent said access door.

4. A housing as in any of claims 1, 2 or 3 wherein said housing is mounted in the ground with soil covering said shoulder to prevent movement of said housing.

5. A housing as in claim 4 further comprising a drainage system located under said fast-flow drain within the interior of said housing for draining water flowing from said basin.

* * * * *